(12) United States Patent
Durham et al.

(10) Patent No.: US 6,832,277 B2
(45) Date of Patent: Dec. 14, 2004

(54) METHOD AND APPARATUS FOR TRANSMITTING DATA THAT UTILIZES DELAY ELEMENTS TO REDUCE CAPACITIVE COUPLING

(75) Inventors: Christopher M. Durham, Round Rock, TX (US); Parsotam T. Patel, Austin, TX (US)

(73) Assignee: Sun Microsystems, Inc., Palo Alto, CA (US)

( * ) Notice: Subject to any disclaimer, the term of this patent is extended or adjusted under 35 U.S.C. 154(b) by 580 days.

(21) Appl. No.: 09/923,248

(22) Filed: Aug. 2, 2001

(65) Prior Publication Data

US 2003/0028692 A1 Feb. 6, 2003

(51) Int. Cl.$^7$ ............................. G06F 13/38; G06F 1/04
(52) U.S. Cl. .......................... 710/100; 713/401; 710/33
(58) Field of Search ................................ 710/1, 33, 316, 710/100, 305; 713/401, 502; 370/517, 362, 489; 327/392, 400; 340/825; 709/253; 711/167; 326/93

(56) References Cited

U.S. PATENT DOCUMENTS

| | | | |
|---|---|---|---|
| 4,573,120 A | * 2/1986 | Ichimiya et al. ................ | 710/1 |
| 6,031,401 A | * 2/2000 | Dasgupta .................... | 327/116 |
| 6,144,325 A | 11/2000 | Chiu et al. .................. | 341/102 |
| 6,178,186 B1 | * 1/2001 | Baker et al. ................ | 370/517 |
| 6,189,133 B1 | 2/2001 | Durham et al. ............... | 716/12 |
| 6,209,055 B1 | 3/2001 | Durham et al. .............. | 710/131 |
| 6,219,756 B1 | 4/2001 | Kasamizugami ............ | 711/127 |
| 6,226,217 B1 | 5/2001 | Riedlinger et al. .... | 365/230.05 |
| 6,275,950 B1 | * 8/2001 | Yeh ............................ | 713/401 |
| 6,288,592 B1 | * 9/2001 | Gupta ........................ | 327/392 |

FOREIGN PATENT DOCUMENTS

| | | | |
|---|---|---|---|
| EP | 0533091 A2 | 3/1993 | ........... H04L/25/49 |
| EP | 0933874 A1 | 8/1999 | ......... H03K/19/003 |

OTHER PUBLICATIONS

"The impact of timing on linearizability in counting networks" by M. Mavronicolas, M. Papatriantafilou and P. Tsigas (abstract only).*

"Performance of a novel selection diversity technique in an experimental TDMA system for digital portable radio communications" by A. Afrashteh and D. Chukurov (abstract only).*

* cited by examiner

*Primary Examiner*—Gopal C. Ray
(74) *Attorney, Agent, or Firm*—Park, Vaughan & Fleming LLP

(57) ABSTRACT

A method of broadcasting N, an even integer, bits of data onto a bus that includes a first plurality of electrical conductors and a second plurality of electrical conductors. The method includes: broadcasting a first portion of data that includes N/2 bits of data onto the first plurality of electrical conductors. Then, after a time period has elapsed that is greater than 0 seconds and less than the time period required to transfer 2 bits of data sequentially on one of the first plurality of electrical conductors, broadcasting a second portion of data that includes N/2 bits of data onto the second plurality of electrical conductors.

Figure 1:
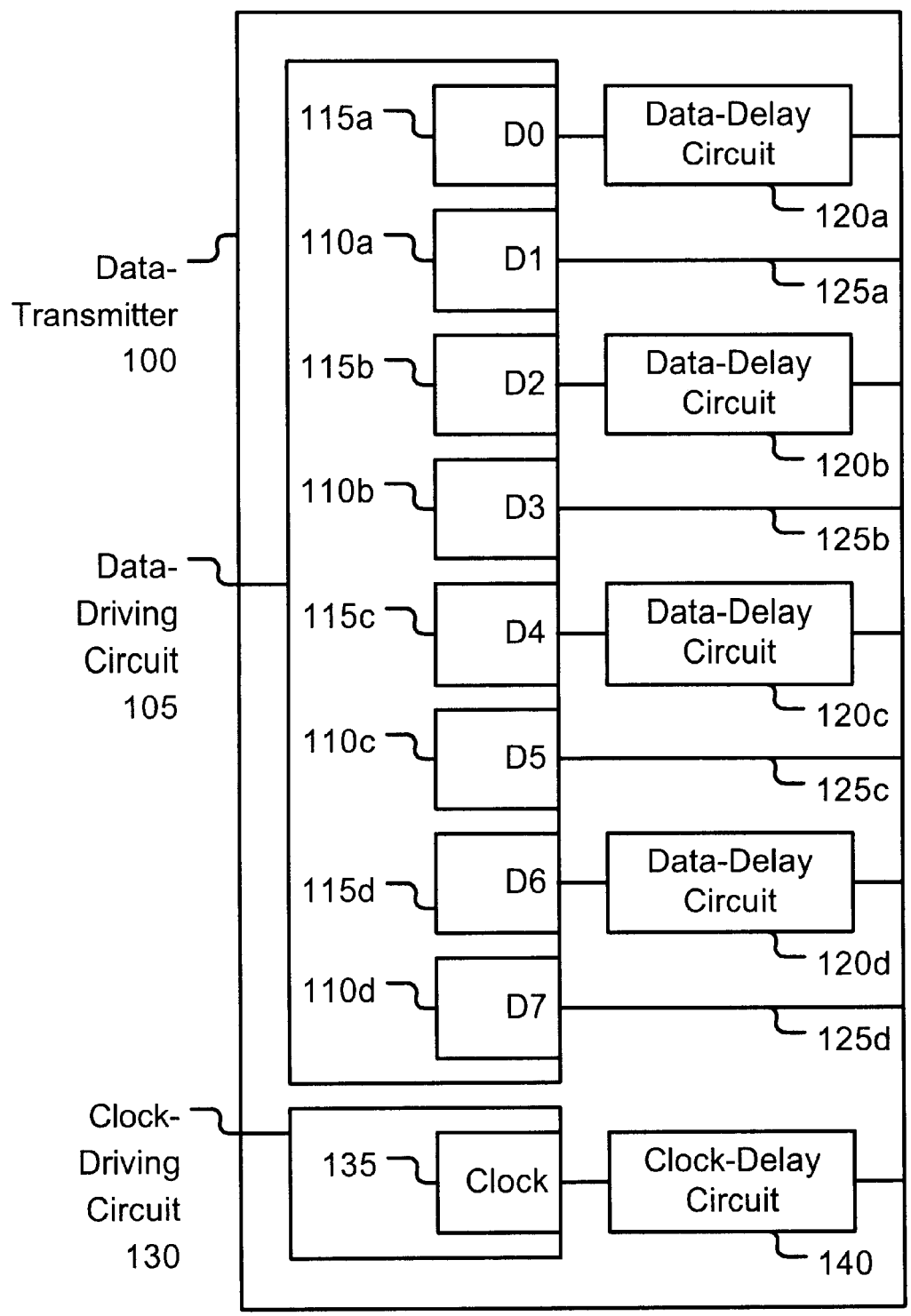

38 Claims, 6 Drawing Sheets

METHOD AND APPARATUS FOR TRANSMITTING DATA THAT UTILIZES DELAY ELEMENTS TO REDUCE CAPACITIVE COUPLING

1. FIELD OF THE INVENTION

The present invention generally relates to methods of transferring data between a data-transmitter and a data-receiver. More specifically, the invention relates to data-transmitters, data-receivers, and methods of broadcasting data onto a bus that reduce effective capacitive coupling (and data errors resulting from such capacitive coupling) between parallel interconnects during such data transfers.

2. BACKGROUND

In modern microprocessors, large numbers of interconnect wires, i.e., electrical conductors, connect various circuits. Many of these electrical conductors, such as metal traces in integrated circuits, run parallel for significant distances, and are therefore subject to noise from capacitive coupling. Such parallel metal traces may be on a single metallization layer within an integrated circuit. Alternatively, such parallel metal traces may be on different metallization layers within an integrated circuit. Capacitive coupling between parallel electrical conductors can create significant time delays. In addition, as discussed in U.S. Pat. No. 6,189,133 to Durham et al., capacitive coupling of parallel electrical conductors may result in false signal transitions in dynamic and self-timed circuits if the electrical conductors exceed 300 to 500 $\mu$m in length.

Thus, it could be desirable to provide a method and apparatus for avoiding capacitive coupling of parallel electrical conductors.

3. SUMMARY OF INVENTION

One embodiment of the invention is a data-transmitter for transmitting data. The data-transmitter includes a data-driving circuit. The data-driving circuit can output a first plurality of data values via a first plurality of data-output ports and can output a second plurality of data values via a second plurality of data-output ports. The data-transmitter also includes a plurality of data-delay circuits. Each of the inputs of the plurality of data-delay circuits is coupled to one of the second plurality of data-output ports. The data-transmitter also includes a plurality of electrical conductors. Each of the plurality of electrical conductors is coupled to one of the first plurality of data-output ports.

Another embodiment of the invention is a data-transmitter for transmitting data. The data-transmitter includes a data-driving circuit. The data-driving circuit can output a first plurality of data values via a first plurality of data-output ports and can output a second plurality of data values via a second plurality of data-output ports. The data-transmitter also includes a clock-delay circuit. The input of the clock-delay circuit is coupled to the first plurality of data-output ports and can strobe the first plurality of data-output ports. The output of the clock-delay circuit is coupled to the second plurality of data-output ports and can strobe the second plurality of data-output ports.

Still another embodiment of the invention is a data-receiver for receiving data. The data-receiver includes a plurality of data-delay circuits. The data-receiver also includes a plurality of electrical conductors and a data-receiving circuit. The data-receiving circuit includes a first plurality of data-input ports and a second plurality of data-input ports. The first plurality of data-input ports can receive, sample, and store a first plurality of data values. The second plurality of data-input ports can receive, sample, and store a second plurality of data values. Each of the outputs of the plurality of data-delay circuits is coupled to one of the first plurality of data-input ports of the data-receiving circuit. Each of the plurality of electrical conductors is coupled to one of the second plurality of data-input ports of the data-receiving circuit.

Yet another embodiment of the invention is another data-receiver for receiving data. This data-receiver includes a clock-delay circuit. The clock-delay circuit can delay a clock signal and can output a delayed-clock signal. The data-receiver also includes a first plurality of data-ports. The first plurality of data-ports can receive a first portion of data. The first plurality of data-ports is coupled to the second plurality of data-ports and can be strobed by the clock signal. The data-receiver also includes a second plurality of data-ports. The second plurality of data-ports can receive a second portion of data. The second plurality of data-ports can be strobed by the delayed-clock signal.

Still another embodiment is a method of broadcasting N, an even integer, bits of data onto a bus that includes a first plurality of electrical conductors and a second plurality of electrical conductors. The method includes: broadcasting a first portion of data that includes N/2 bits of data onto the first plurality of electrical conductors. Then, after a time period has elapsed that is greater than 0 seconds and less than the time period required to transfer 2 bits of data sequentially on one of the first plurality of electrical conductors, broadcasting a second portion of data that includes N/2 bits of data onto the second plurality of electrical conductors.

4. BRIEF DESCRIPTION OF THE FIGURES

FIG. 1 presents one embodiment of a data-transmitter

Figure 2:
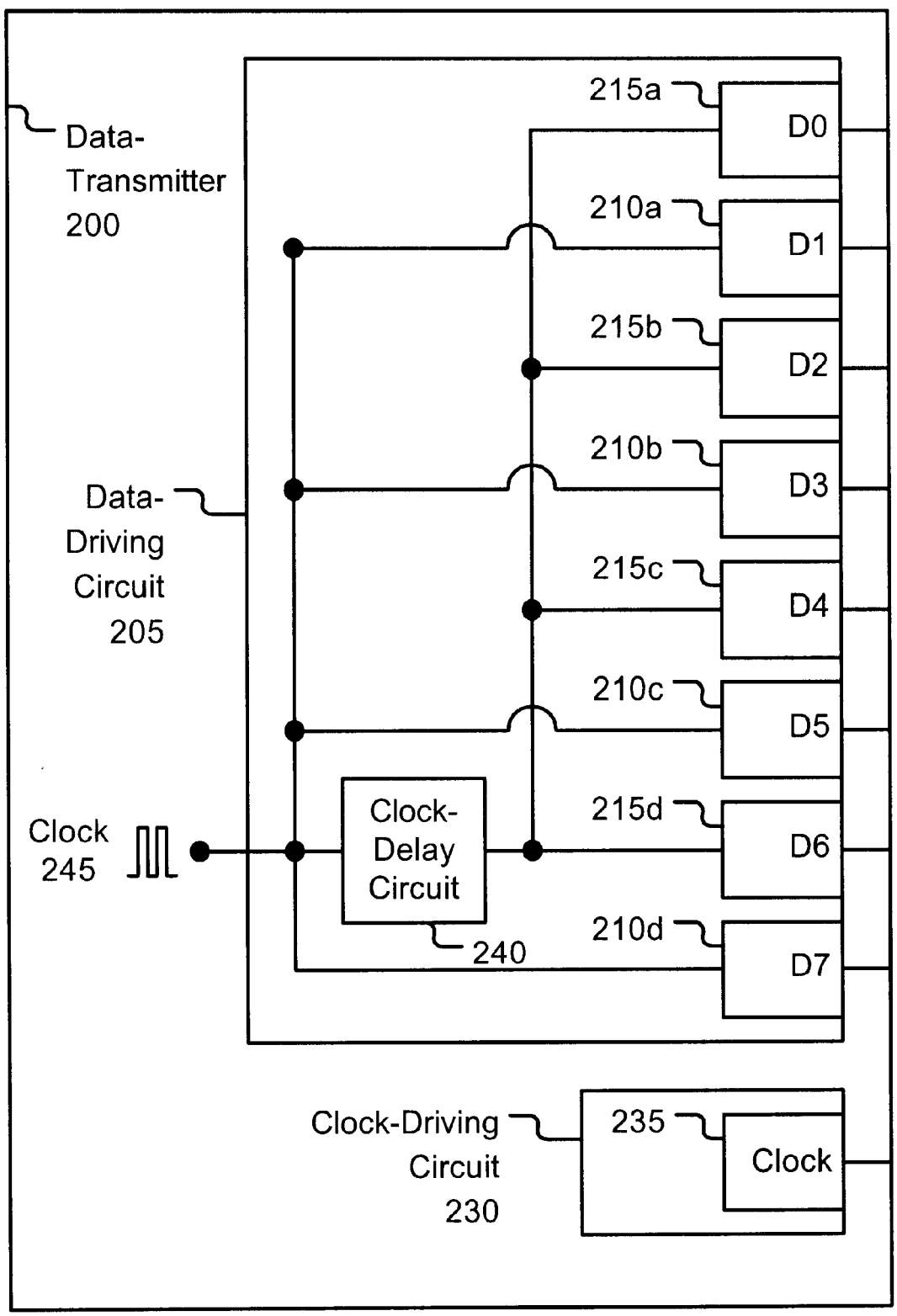

FIG. 2 presents another embodiment of a data-transmitter

Figure 3:
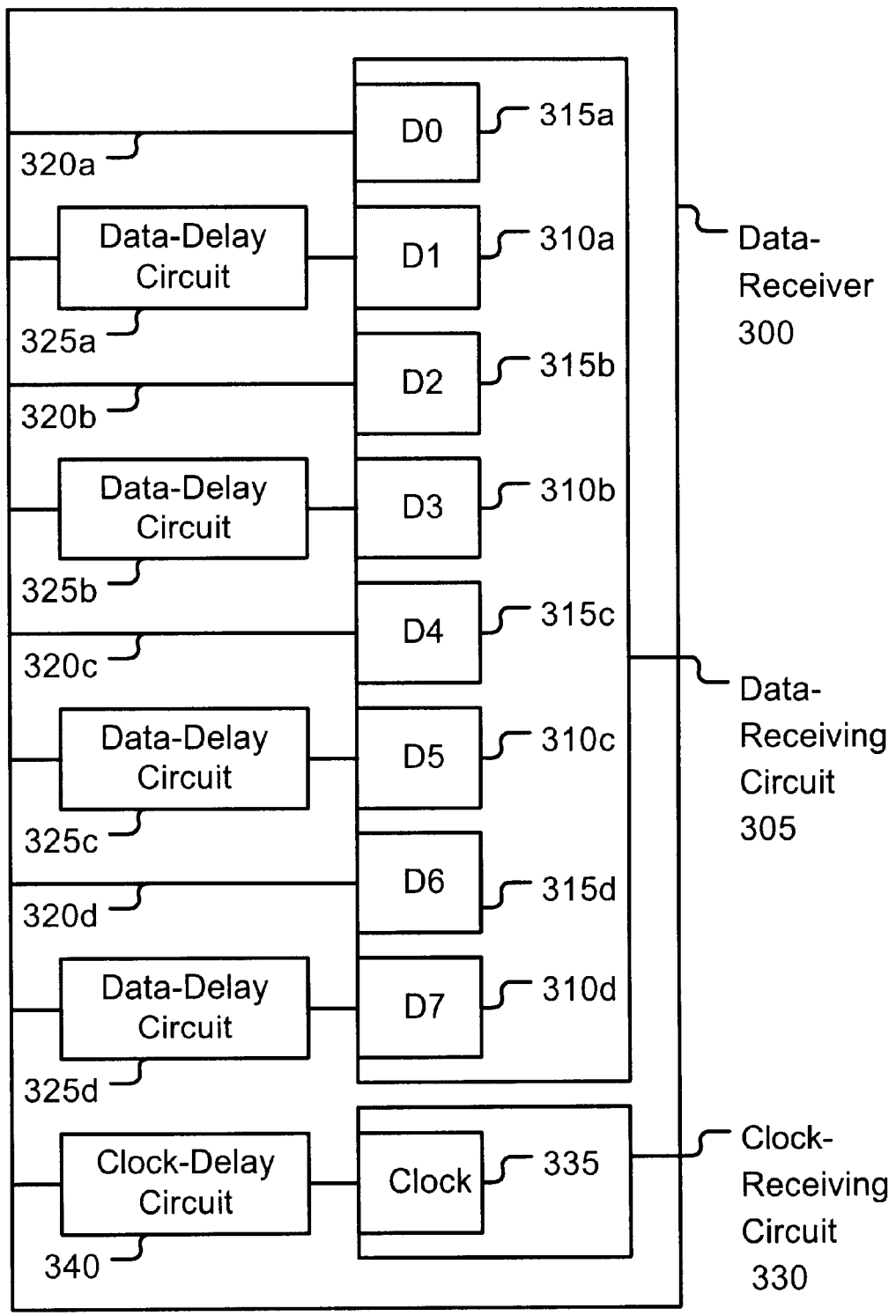

FIG. 3 presents one embodiment of a data-receiver.

Figure 4:
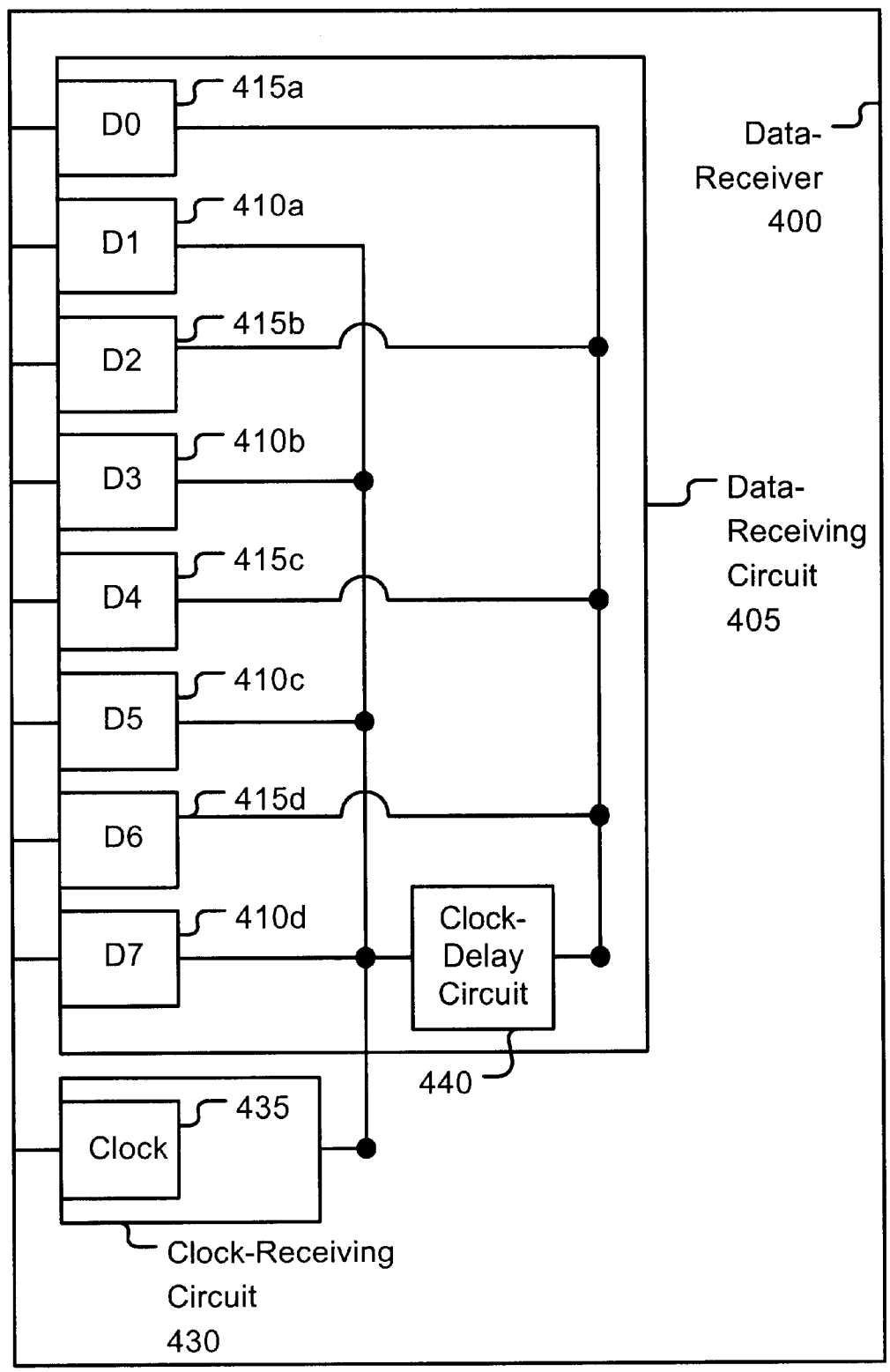

FIG. 4 presents another embodiment of a data-receiver.

Figure 5:
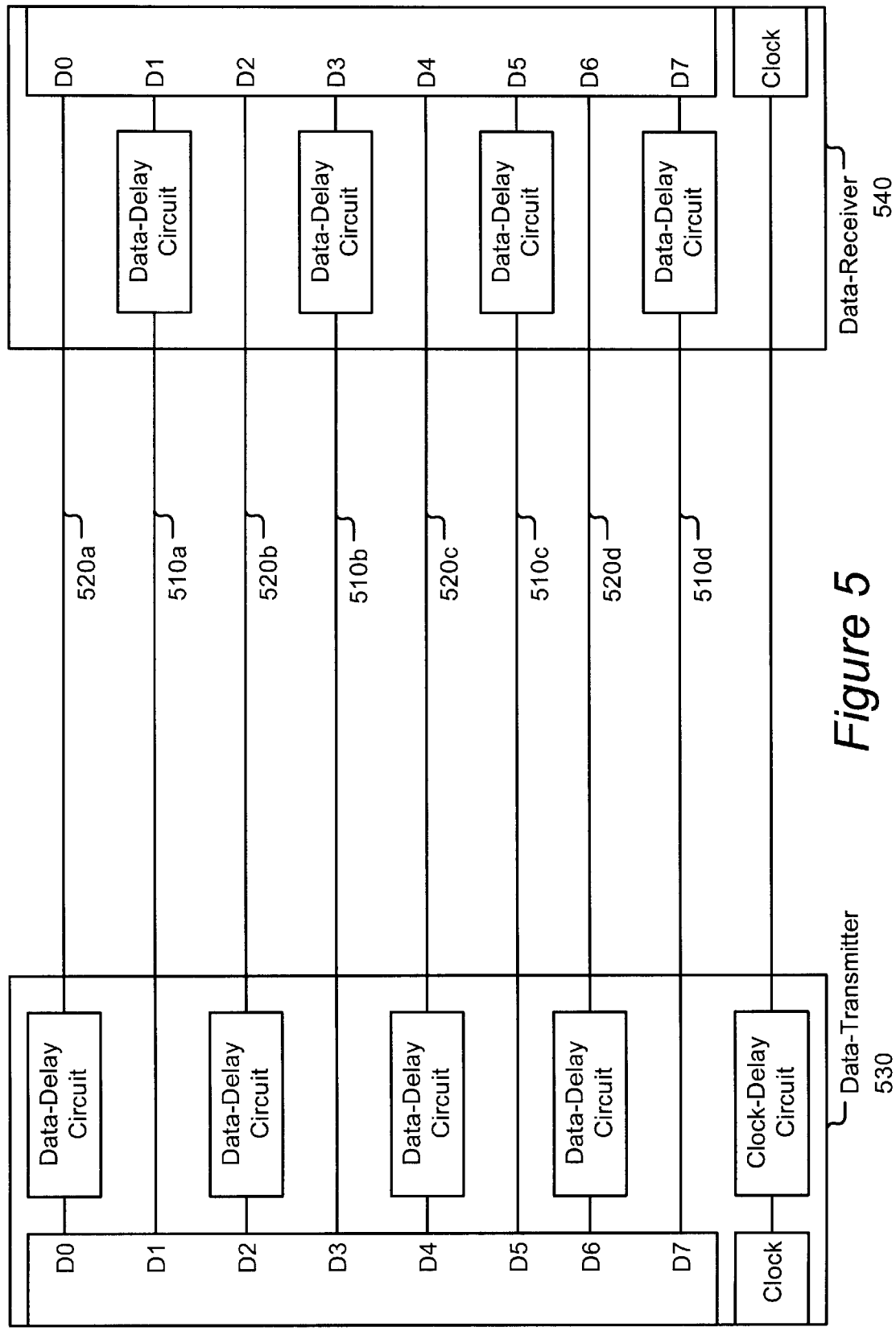

FIG. 5 presents a system for transferring data from a data-transmitter to a data-receiver.

Figure 6:
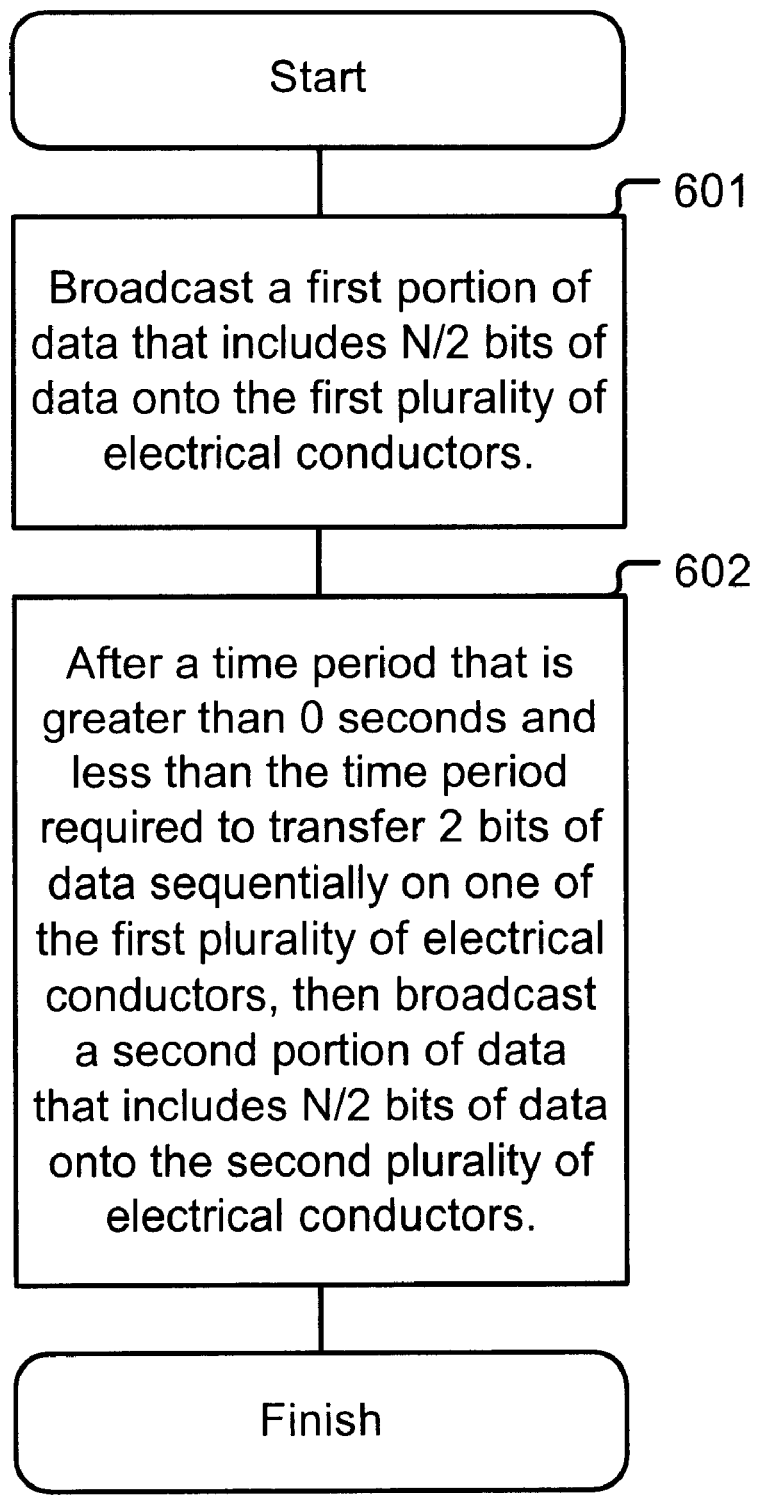

FIG. 6 presents a flow chart of a method of broadcasting data.

5. DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 Embodiments of Data-Transmitters

One embodiment of the invention, which is shown in FIG. 1, is a data-transmitter 100. The data-transmitter 100 can broadcast a portion of data, such as the odd data-bits of a byte of data, onto a bus and then broadcast another portion of data, such as the even data-bits of a byte of data, onto the bus at a time that is slightly after the time that the first portion of data was broadcast. As a result, effective capacitive coupling between adjacent bits in the bus is reduced.

As shown in FIG. 1, the data-transmitter 100 includes a data-driving circuit 105. The data-driving circuit 105 can output a first plurality of data values via a first plurality of data-output ports 110. In addition, the data-driving circuit 105 can output a second plurality of data values via a second plurality of data-output ports 115. For example, in some embodiments of the invention, the data-driving circuit 105 could output even-numbered data-bits of a data-byte via the first plurality of data-output ports 110 and could output odd-numbered data-bits of the data-byte via the second plurality of data-output ports 115. In other embodiments of the invention, the data-driving circuit 105 could output odd-numbered data-bits via the first plurality of data-output ports 110 and could output even-numbered data-bits via the second plurality of data-output ports 115.

While FIG. 1 shows a data-transmitter 100 that includes 8 data-output ports, other data-transmitters could have any number of data-output ports, such as 2, 4, 16, 32, 64, or 128 data-output ports. Thus, if the data-transmitter is a register within a microprocessor, the register could broadcast a portion of a byte, a byte, or multiple bytes of data to a microprocessor bus via a number of data-output ports.

Referring again to FIG. 1, the data-transmitter 100 also includes a plurality of data-delay circuits 120. The inputs of the data-delay circuits are coupled to the second plurality of data-output ports 115. In some embodiments of the invention, such as in embodiments utilized in microprocessors, the data-delay circuits could include two inverters placed in series. These two inverters could delay data by 75 ps or more. Such a delay is approximately equal to ¾ of the transition time (100 ps) of data-bits in modern microprocessors.

The data-transmitter 100 also includes a plurality of electrical conductors 125. As shown in FIG. 1, the electrical conductors 125 are coupled to the first plurality of data-output ports 110. As is evident from FIG. 1, in some embodiments of the invention, a electrical conductor 125a, 125b, or 125c is positioned between adjacent data-delay circuits 120a-120b, 120b-120c, or 120c-120d.

In some embodiments of the invention, the data-transmitter 100 could also include a clock-driving circuit 130. The clock-driving circuit could be operable to output a clock signal via a clock-output port 135. In some embodiments, such as is shown in FIG. 1, the data-transmitter 100 could also include a clock-delay circuit 140. In such embodiments, the clock-delay circuit 140 could delay the clock by the same amount that the data-delay circuits 120 delay data.

During operation, the data-transmitter 100 would typically be coupled to a bus (not shown), which may include a plurality of relatively long parallel electrical conductors, such as metal traces. When the data-transmitter 100 begins its sequence of steps to broadcast data onto the bus, the data driving circuit 105 would first output data via the first and second pluralities of data-output ports 110 and 115. In some embodiments of the invention, such as shown in FIG. 1, the data would be output to the first and second plurality of data-output ports 110 and 115 at approximately the same time. A first portion of the data would be immediately broadcast to the bus. On the other hand, the data-delay circuits 120 would delay the broadcast of the second portion of the data for a short period of time. Thus, if the delay of the second portion of the data is sufficient, then each electrical conductor in the bus that is undergoing a signal transition would be adjacent to one or more "quiet" electrical conductors in which no signal transition is occurring. As a result, the effective capacitive coupling between adjacent bits in the bus would be reduced.

5.2 Other Embodiments of Data-Transmitters

Another embodiment of the invention is a data-transmitter 200, which is shown in FIG. 2. This data-transmitter is also able to broadcast a portion of data onto a bus and then broadcast another portion of data onto the bus at a time that is slightly after the time that the first portion of data was broadcast.

As shown in FIG. 2, the data-transmitter 200 includes a data-driving circuit 205. The data-driving circuit 205 can output a first plurality of data values via a first plurality of data-output ports 210. In addition, the data-driving circuit 205 can output a second plurality of data values via a second plurality of data-output ports 215.

While the data-transmitter 200 shown in FIG. 2 contains 8 data-output ports, in other embodiments of the invention, the number of data-output ports can vary. For example, the number of data-output ports could be 2, 4, 16, 32, 64, 128 or more. Thus, in some embodiments of the invention, the first plurality of data-output ports 210 would be operable to output a first portion of a byte of data and the second plurality of data-output ports 215 would be operable to output a second portion of the byte of data.

Referring again to FIG. 2, a clock signal 245 is coupled to and operable to strobe the first plurality of data-output ports 210. The clock signal 245 is also input into a clock-delay circuit 240. The clock-delay circuit 240 can be similar to the clock-delay circuit 140 discussed above. The output of the clock-delay circuit 240 is coupled to and operable to strobe the second plurality of data-output ports 215. As a result, the first plurality of data-output ports 210 can broadcast data slightly before the second plurality of data-output ports 215 broadcasts data. If the difference between the time that the first and second portions of data are broadcast is equal to or greater than ¾ of the transition time of the data-bits on a bus (not shown), then the effective capacitive coupling between adjacent data-bits on the bus can be significantly reduced.

In some embodiments of the invention, such as shown in FIG. 2, the data-transmitter 200 may also include a clock driving circuit 230 that is operable to output a clock via a clock-output port 235. In still other embodiments (not shown), the data-transmitter 200 may also drive a delayed clock signal onto a bus (not shown).

5.3 Embodiments of Data-Receivers

Another embodiment of the invention, which is shown in FIG. 3, is a data-receiver 300. The data-receiver 300 can receive a portion of data from a bus and then can receive another portion of data from the bus at a time that is slightly after the time that the first portion of data was received. Because the data-receiver 300 can receive portions of data at different times, the data can be accurately received, sampled and stored after the data has been broadcast onto the bus by a data-transmitter such as discussed above and then transferred by the bus in a manner that reduces effective capacitive coupling between adjacent bits in the bus.

As shown in FIG. 3, the data-receiver 300 includes a plurality of data-delay circuits 325. In addition, the data-receiver 300 includes a plurality of electrical conductors 320. The data-receiver 300 also includes a data-receiving circuit 305.

The data-receiving circuit 305 includes a first plurality of data-input ports 310 and a second plurality of data-input ports 315. The first plurality of data-input ports 310 can receive, sample, and store a first plurality of data values.

Similarly, the second plurality of data-input ports 315 can receive, sample, and store a second plurality of data values. For example, the first plurality of data-input ports 310, as shown in FIG. 3, could receive, sample, and store the odd bits of a byte of data while the second plurality of data-input ports 315 could receive, sample, and store the even bits of the byte of data. In other embodiments of the invention, the first plurality of data-input ports 310 could receive, sample, and store the even bits of the byte of data and the second plurality of data-input ports 315 could receive, sample, and store the odd bits of the byte of data.

Referring again to FIG. 3, the outputs of each of the plurality of data-delay circuits are coupled to one of the first plurality of data-inputs 310. Similarly, each of the plurality of electrical conductors 320 is coupled to one of the second plurality of data-input ports 315.

During operation, the data-receiver 300 could be coupled to a bus (not shown), which may include a plurality of relatively long parallel electrical conductors. When the data-receiver 300 begins its sequence of steps to receive data from the bus, the data-delay circuits 325 would receive a first portion of data. After a predetermined delay, the data-delay circuits 325 would output the first portion of data to the first plurality of data-input ports 310 at approximately the same time that the second plurality of data-input ports 315 would be receiving the second portion of data from the bus. As a result, the first plurality of data-input ports 310 would receive the first portion of the data at approximately the same time that the second plurality of data-input ports 315 would receive the second portion of the data. After the data-input ports 315 and 310 receive the data, the data-input ports would sample and store the data.

In some embodiments of the invention, the data-receiver 300 also includes a clock-delay circuit 340. As shown in FIG. 3, the output of the clock-delay circuit 340 could be coupled to a clock-receiving circuit 330. Usage of a clock-delay circuit 340 in the data-receiver 300 could be useful to synchronize a clock signal, which has not been delayed by a data-transmitter, with data that has been delayed by a data-transmitter.

5.4 Other Embodiments of Data-Receivers

Another embodiment of the invention, which is shown in FIG. 4, is another data-receiver 400 that can receive a first portion of data from a bus and then receive a second portion of data from the bus at a time that is slightly after the time that the first portion of data was received. Because the data-receiver 400 can receive portions of data at different times, the data can be transferred on the bus in a manner that reduces effective capacitive coupling between adjacent bits in the bus.

As shown in FIG. 4, the data-receiver 400 includes a clock-delay circuit 440. The clock-delay circuit 440 can delay a clock signal and can output a delayed-clock signal.

Referring again to FIG. 4, the data-receiver 400 includes a first plurality of data ports 410. The first plurality of data-ports 410 can receive a first portion of data. The first plurality of data-ports 410 is coupled to the input of the clock-delay circuit 440. Thus, the first plurality of data-ports 410 can be strobed by the clock signal.

The data-receiver 400 also includes a second plurality of data ports 415. The second plurality of data-ports 415 can receive a second portion of data. The second plurality of data-ports 415 is coupled to the output of the clock-delay circuit 440. Thus, the second plurality of data-ports 415 can be strobed by the delayed-clock signal.

In some embodiments of the invention, the data-receiver may also include a clock-receiving circuit 430. The clock receiving circuit 430 could be coupled to the clock-delay circuit 440.

During operation, the data-receiver 400 would typically be coupled to a bus (not shown). When the data-receiver 400 begins its sequence of steps to receive data from the bus, the first plurality of data-input ports 410 would be strobed by the clock signal. When the first plurality of data-input ports 410 is strobed by the clock signal, the first plurality of data-input ports 410 would receive, sample, and store the first portion of data.

Slightly after the time that the first plurality of data-input ports 410 is strobed by the clock signal, the second plurality of data-input ports would be strobed by the delayed-clock clock signal. Thus, the second plurality of data-input ports 415 would receive, sample, and store the second portion of data.

In some embodiments of the invention, the clock signal would be received from the bus via clock-receiving circuit 430. In other embodiments of the invention (not shown), the clock signal would be received from another source.

5.5 Methods of Transferring Data

FIG. 5 presents a high-level block diagram of a system that is operable to broadcast N, an even integer, data-bits onto a bus that includes a first plurality of electrical conductors 510 and a second plurality of electrical conductors 520.

FIG. 6 presents one method of operating the system shown in FIG. 5. First, as shown in Block 601, the data-transmitter 530 broadcasts a first portion of data that includes N/2 data-bits onto the first plurality of electrical conductors 510. In some embodiments of the invention, the first portion of data may be the even data-bits. In other embodiments of the invention, the first portion of data may be the odd data-bits.

Next, referring to Block 602, after a time period that is greater than 0 seconds and less than the time period required to transfer 2 bits of data sequentially from the data-transmitter 530 to the data-receiver 540 on any single electrical conductor on the bus, the data-transmitter 530 broadcasts a second portion of data that includes N/2 bits of data onto the second plurality of electrical conductors. In some embodiments of the invention, the second portion of data may be the odd data-bits. In other embodiments of the invention, the second portion of data may be the even data-bits.

If the above time period is equal to or greater than ¾ of the bit transition time of the data-bits on the bus, then the effective capacitive coupling between adjacent data-bits in the bus can be significantly reduced. Such a method would be particularly useful if the bus transfers an even data-bit on a electrical conductor that is adjacent, for a length greater than 300 $\mu$m, to a electrical conductor that transfers an odd data-bit.

5.6 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. The data-transmitters, data-receivers and methods described above can be utilized in transferring data to and from electrical elements, such as registers in microprocessors, and digital signal processors. In addition, they can be utilized to transfer data between computer systems connected by cables. Additionally, the above disclosure is not intended to limit the present invention. The scope of the present invention is defined by the appended claims.

It is claimed:

1. A data-transmitter for transmitting data, the data-transmitter comprising:
   a) a data-driving circuit, the data-driving circuit operable to output a first plurality of data values via a first plurality of data-output ports and operable to output a second plurality of data values via a second plurality of data-output ports;
   b) a plurality of data-delay circuits, each of the inputs of the plurality of data-delay circuits being coupled to one of the second plurality of data-output ports and configured to delay at least one data signal; and
   c) a plurality of electrical conductors, each of the plurality of electrical conductors being coupled to one of the first plurality of data-output ports, at least one of the electrical conductors being configured to transmit at least one data signal that has not been delayed by one of the plurality of data-delay circuits.

2. The data transmitter of claim 1, wherein one of the plurality of electrical conductors is positioned between a first data-delay circuit of the plurality of data-delay circuits and a second data-delay circuit of the plurality of data-delay circuits.

3. The data transmitter of claim 1, further comprising:
   d) a clock-driving circuit, the clock-driving circuit operable to output a clock via a clock-output port; and
   e) a clock-delay circuit, the input of the clock-delay circuit being coupled to the clock-output port.

4. The data-transmitter of claim 1, wherein at least one of the plurality of data-delay circuits includes two inverters.

5. The data-transmitter of claim 1, wherein the data-transmitter is a register.

6. The data-transmitter of claim 1, wherein the data-transmitter is operable to broadcast a portion of a byte of data.

7. The circuit of claim 1, wherein the first plurality of data-output ports is operable to transfer a portion of a byte of data.

8. The circuit of claim 1, wherein the first plurality of data-output ports is operable to output a first portion of a byte of data and the second plurality of data-output ports is operable to output a second portion of the byte of data.

9. A data-transmitter for transmitting data, the data-transmitter comprising:
   a) a data-driving circuit, the data-driving circuit operable to output a first plurality of data values via a first plurality of data-output ports and operable to output a second plurality of data values via a second plurality of data-output ports; and
   b) a clock-delay circuit, the input of the clock-delay circuit coupled to and operable to strobe the first plurality of data-output ports, the output of the clock-delay circuit coupled to and operable to strobe the second plurality of data-output ports.

10. The data transmitter of claim 9, further comprising:
   c) a clock-driving circuit, the clock-driving circuit operable to output a clock via a clock-output port.

11. The data-transmitter of claim 9, wherein the clock-delay circuit includes two inverters.

12. The data-transmitter of claim 9, wherein the data-transmitter is a register.

13. The data-transmitter of claim 9, wherein the data-transmitter is operable to broadcast a portion of a byte of data.

14. The circuit of claim 9, wherein the first plurality of data-output ports is operable to transfer a portion of a byte of data.

15. The circuit of claim 9, wherein the first plurality of data-output ports is operable to output a first portion of a byte of data and the second plurality of data-output ports is operable to output a second portion of the byte of data.

16. A data-receiver for receiving data, the data-receiver comprising:
   a) a plurality of data-delay circuits configured to delay at least one data signal;
   b) a plurality of electrical conductors; and
   c) a data-receiving circuit, the data-receiving circuit including a first plurality of data-input ports and a second plurality of data-input ports, the first plurality of data-input ports being operable to receive, sample, and store a first plurality of data values, the second plurality of data-input ports being operable to receive, sample, and store a second plurality of data values, each of the outputs of the plurality of data-delay circuits being coupled to one of the first plurality of data-input ports of the data-receiving circuit, and each of the plurality of electrical conductors being coupled to one of the second plurality of data-input ports of the data-receiving circuit, at least one of the electrical conductors being configured to receive at least one data signal that has not been delayed by one of the plurality of data-delay circuits.

17. The data-receiver of claim 16, wherein one of the plurality of electrical conductors is positioned between a first data-delay circuit of the plurality of data-delay circuits and a second data-delay circuit of the plurality of data-delay circuits.

18. The data-receiver of claim 16, further comprising:
   a) a clock-receiving circuit, the clock-receiving circuit operable to receive a clock signal; and
   b) a clock-delay circuit, the output of the clock-delay circuit being coupled to the clock-receiving circuit.

19. The data-receiver of claim 16, wherein at least one of the plurality of data-delay circuits includes two inverters.

20. The data-receiver of claim 16, wherein the data-receiver is a register.

21. The circuit of claim 16, wherein the first plurality of data-input ports is operable to receive a portion of a byte of data.

22. The circuit of claim 16, wherein the first plurality of data-input ports is operable to receive a first portion of a byte of data and the second plurality of data-input ports is operable to receive a second portion of the byte of data.

23. A data-receiver for receiving data, the data-receiver comprising:
   a) a clock-delay circuit, the clock-delay circuit operable to delay a clock signal and operable to output a delayed-clock signal;
   b) a first plurality of data-ports, the first plurality of data-ports operable to receive a first portion of data, the first plurality of data-ports coupled to and operable to be strobed by the clock signal; and
   c) a second plurality of data-ports, the second plurality of data-ports operable to receive a second portion of data, the second plurality of data-ports operable to be strobed by the delayed-clock signal.

24. The data-receiver of claim 23, wherein the clock-delay circuit includes two inverters.

25. The data-receiver of claim 23, wherein the data-receiver is a register.

26. The data-receiver of claim 23, wherein the first plurality of data-input ports is operable to receive a portion of a byte of data.

27. The data-receiver of claim 23, wherein the first plurality of data-input ports is operable to receive a first portion of a byte of data and the second plurality of data-input ports is operable to receive a second portion of the byte of data.

28. The data-receiver of claim 23, further including a clock-receiving circuit, the clock-receiving circuit operable to receive the clock, the clock-receiving circuit coupled to the clock-delay circuit.

29. A method of broadcasting N, an even integer, bits of data onto a bus that includes a first plurality of electrical conductors and a second plurality of electrical conductors, the method comprising:

a) receiving N bits of data;

b) broadcasting a first portion of the data that includes N/2 bits of the data onto the first plurality of electrical conductors; and c) after a time period that is greater than 0 seconds and less than the time period required to transfer 2 bits of data sequentially on one of the first plurality of electrical conductors, then broadcasting a second portion of the data that includes N/2 bits of the data onto the second plurality of electrical conductors, the second portion of the data being distinct from the first portion of the data.

30. The method of claim 29, wherein the act of broadcasting the first portion of data includes broadcasting a plurality of even data-bits.

31. The method of claim 29, wherein the act of broadcasting the first portion of data includes broadcasting a plurality of odd data-bits.

32. The method of claim 29, wherein the act of broadcasting the second portion of data includes broadcasting a plurality of even data-bits.

33. The method of claim 29, wherein the act of broadcasting the second portion of data includes broadcasting a plurality of odd data-bits.

34. The method of claim 29, wherein the act of broadcasting a first portion of data includes broadcasting the first portion from a register onto the bus.

35. The method of claim 29, wherein the act of broadcasting a first portion of data includes broadcasting the first portion from a register onto a microprocessor bus.

36. The method of claim 29, wherein the act of broadcasting the first portion of data includes broadcasting the first portion of data onto a bus that is operable to transfer an even data-bit on a electrical conductor that is adjacent, for a length greater than 300 $\mu$m, to a electrical conductor that is operable to transfer an odd data-bit.

37. The method of claim 29, wherein the act of broadcasting the second portion of data after a time period includes broadcasting the second portion of data after a time period that is greater than ¾ of the transition time of data-bits on the bus.

38. The method of claim 29, wherein the act of broadcasting the second portion of data after a time period includes broadcasting the second portion of data after a time period that is greater than 75 ps.

* * * * *